United States Patent
Yasuhara

(10) Patent No.: US 9,930,022 B2
(45) Date of Patent: Mar. 27, 2018

(54) INFORMATION PROCESSING SYSTEM, INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Hiroshi Yasuhara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 297 days.

(21) Appl. No.: 14/820,704

(22) Filed: Aug. 7, 2015

(65) Prior Publication Data
US 2016/0044010 A1 Feb. 11, 2016

(30) Foreign Application Priority Data

Aug. 8, 2014 (JP) .................................. 2014-163047

(51) Int. Cl.
H04L 29/06 (2006.01)

(52) U.S. Cl.
CPC ...... H04L 63/062 (2013.01); *H04L 2463/103* (2013.01)

(58) Field of Classification Search
CPC .................... H04L 63/062; H04L 2463/103
See application file for complete search history.

(56) References Cited

U.S. PATENT DOCUMENTS

| | | | | |
|---|---|---|---|---|
| 9,532,210 | B2* | 12/2016 | Hao | H04W 8/22 |
| 2002/0016846 | A1* | 2/2002 | Ono | G06F 21/10 709/229 |
| 2002/0038346 | A1* | 3/2002 | Morrison | G06F 3/1454 709/205 |
| 2005/0165893 | A1* | 7/2005 | Feinberg | G06F 11/302 709/205 |
| 2005/0204362 | A1* | 9/2005 | Chatterjee | H04L 63/0815 719/318 |
| 2006/0149845 | A1* | 7/2006 | Malin | H04L 67/322 709/228 |
| 2007/0083766 | A1* | 4/2007 | Farnham | H04L 63/0435 713/176 |
| 2007/0157156 | A1* | 7/2007 | Meier | G06F 21/554 717/101 |
| 2008/0112405 | A1* | 5/2008 | Cholas | H04L 63/062 370/389 |

(Continued)

FOREIGN PATENT DOCUMENTS

JP 2011-076621 A 4/2011

*Primary Examiner* — John B King
(74) *Attorney, Agent, or Firm* — Carter, DeLuca, Farrell & Schmidt, LLP

(57) ABSTRACT

There is provided an information processing system, information processing apparatus, and a method of controlling the same. Upon receiving an encrypted application and encrypted license information, the information processing apparatus decrypts the encrypted license information and the encrypted application. It is determined whether or not the decrypted application is a web application, and in the case where the application is determined to be a web application, a URL contained in the application and information contained in the license information are registered, and a display item corresponding to the application is displayed in a menu screen.

6 Claims, 10 Drawing Sheets

(56) References Cited

U.S. PATENT DOCUMENTS

| | | | | |
|---|---|---|---|---|
| 2009/0013031 A1* | 1/2009 | Nolet | ................ | G06Q 30/02 |
| | | | | 709/203 |
| 2014/0165053 A1* | 6/2014 | Escobar-Olmos | .... | G06F 21/105 |
| | | | | 717/178 |
| 2015/0186621 A1* | 7/2015 | Uy | ................ | G06F 21/10 |
| | | | | 726/26 |

* cited by examiner

FIG. 5A

| APPLICATION ID | APPLICATION COMMON ENCRYPTION KEY |
|---|---|
| APP001 | OhVyoiuARmcu...... |
| APP002 | WasilDcQR6dYj...... |
| APP003 | tjoE1ijp321rAeh...... |
| ... | ... |

501 — APPLICATION ID
502 — APPLICATION COMMON ENCRYPTION KEY

FIG. 5B

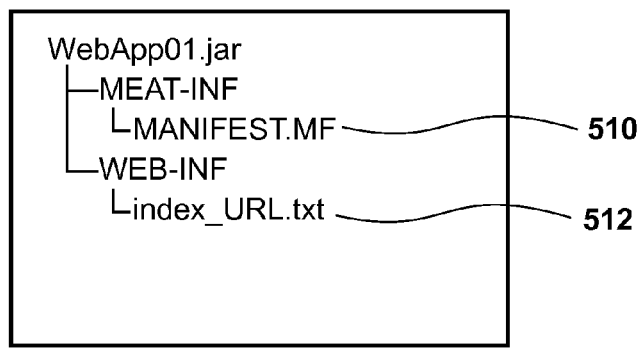

```
WebApp01.jar
   ├─MEAT-INF
   │    └─MANIFEST.MF ──── 510
   └─WEB-INF
        └─index_URL.txt ──── 512
```

FIG. 5C

| APPLICATION ID | LICENSE ACCESS NUMBER | EXPIRATION DATE | DEVICE ID | LICENSE ID |
|---|---|---|---|---|
| APP001 | XXX-XXX-101 | UNLIMITED | – | – |
| APP001 | XXX-XXX-102 | UNLIMITED | DEV001 | LIC001 |
| APP002 | XXX-XXX-201 | 20140501 | DEV002 | LIC002 |
| ... | ... | ... | ... | ... |

521, 522, 523, 524, 525
526, 527, 528

LICENSE ID : LIC002
APPLICATION ID : APP002
DEVICE ID : DEV002
EXPIRATION DATE : 20140501
APPLICATION COMMON ENCRYPTION KEY : WasilDcQR6dYj......

FIG. 8

| APPLICATION ID | URL | EXPIRATION DATE | LICENSE ID | LICENSE ID |
|---|---|---|---|---|
| APP001 | — | UNLIMITED | LIC001 | — |
| APP002 | http://xxxxxx | 20140501 | LIC002 | LIC003 |
| ... | ... | ... | ... | ... |

F I G. 12
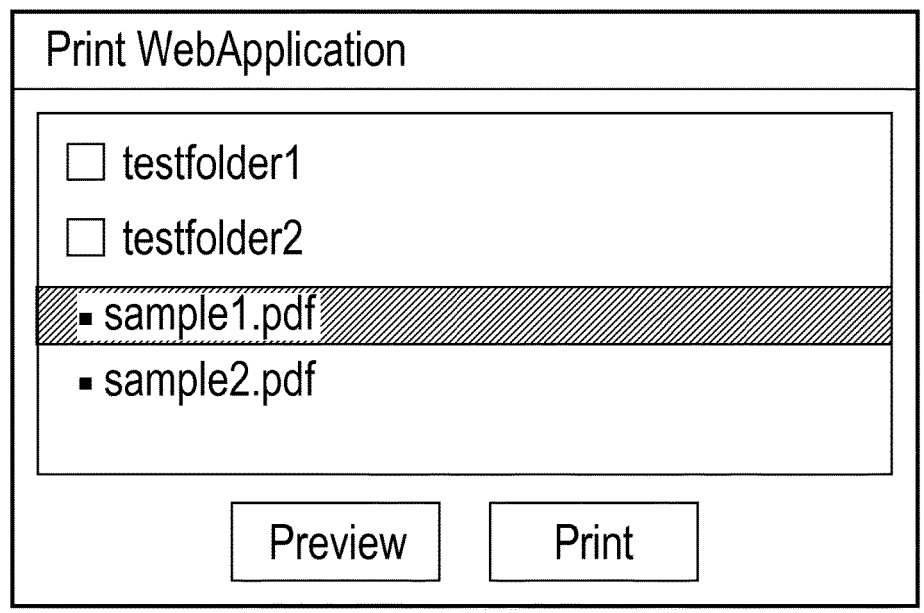

INFORMATION PROCESSING SYSTEM, INFORMATION PROCESSING APPARATUS, METHOD OF CONTROLLING THE SAME, AND STORAGE MEDIUM

BACKGROUND OF THE INVENTION

Field of the Invention

The present invention relates to information processing systems, information processing apparatuses, methods of controlling the same, and storage media.

Description of the Related Art

A technique is known in which an information processing apparatus such as a PC displays, using a web browser installed in the information processing apparatus, an operating screen of a web application provided from a web server to which the information processing apparatus is connected over a network, and a user makes operations through the operating screen. To use the web application, the user obtains a license for using the web application from a provider of the web application. The operating screen of the web application is then displayed by the web browser of the user's information processing apparatus. As such, a system for the provider of the web application to verify whether or not the connection is being made from a user who has properly purchased a license is necessary. To realize such a system, for example, the operating screen of the web application requests the input of a username and a password, and the user is determined to have properly purchased a license in the case where the username and the password input through that screen match registered information.

Meanwhile, there are also web applications aimed at information processing apparatuses shared by many people, such as multifunction peripherals (MFPs) that have scanning functions, printing functions, and so on. In the case where many people share a single information processing apparatus, web application licenses are sometimes issued for the client terminal as a whole rather than for individual users.

Such license management is not only carried out for respective individual web applications; there are also systems in which license sales and management are collectively carried out by a representative for web applications developed by different web application developers. In this case, based on information from a web browser in a client, a server having a web application makes an inquiry to a license management server that manages licenses and verifies whether or not a license for the web application has been properly purchased by the client.

There is also a system that uses a license file in the installation of an application installed in an information processing apparatus. Such a license file is issued in the case where a license has been purchased for the application, and whether or not a license has been properly purchased for the application is verified by verifying the license file.

Meanwhile, web browsers in information processing apparatuses such as MFPs are often used primarily in order to use web applications. In such a case, for security reasons, a function for restricting the input of URLs, the saving of bookmarks, and so on is provided in order to restrict users from freely accessing web sites. There are also functions for restricting access based on user privileges (see Japanese Patent Laid-Open No. 2011-76621, for example).

Regarding a web application, it is not necessary to install the web application, and thus the license for the web application cannot be managed using a license file. However, a method that verifies a license can be employed for an application installed in an information processing apparatus when the application is installed. Different license management systems are thus necessary depending on the form of the application, and thus different management costs arise for the providers of the applications, the parties that manage the licenses, and so on. Meanwhile, from the user perspective, licenses are authenticated using different procedures depending on the install form of the application, which is cumbersome.

In the case where user information is not to be used when using a web application, user authentication is carried out for the purpose of license management. In such a case, carrying out user authentication in the web application in order to authenticate a license is cumbersome for users.

SUMMARY OF THE INVENTION

An aspect of the present invention is to eliminate the above-mentioned problems with the conventional technology.

A feature of the present invention is to provide a technique of managing licenses for a web application while ensuring the same ease of operation as an application installed in an information processing apparatus.

According to a first aspect of the present invention, there is provided an information processing system including an information processing apparatus having a web browser, and a web server, wherein the information processing apparatus comprises: a reception unit that receives an encrypted software module and encrypted license information of the encrypted software module; a decryption unit that decrypts the encrypted license information received by the reception unit and decrypts the encrypted software module using a decryption key contained in the license information; a storage unit that stores software module and license information decrypted by the decryption unit; a determination unit that, upon an instruction for calling the software module being made, determines whether or not calling of the software module is enabled based on the license information corresponding to the software module; and a requesting unit that, upon the determination unit determining that calling of the software module is enabled, sets a URL contained in the license information in the web browser and makes a request for the software module to the web server, and wherein the web server comprises: a transmitting unit that transmit a screen of a web application corresponding to the URL to the information processing apparatus as a response to the request from the requesting unit.

According to a second aspect of the present invention, there is an information processing apparatus having a web browser, the apparatus comprising: a reception unit that receives an encrypted application and encrypted license information; a decryption unit that decrypts the encrypted license information and the encrypted application; a determination unit that determines whether or not an application decrypted by the decryption unit is a web application; a registration unit that, upon the determination unit determining that the application is a web application, registers a URL contained in the application and information contained in license information decrypted by the decryption unit; and a display unit that displays a display item corresponding to the application in a menu screen.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5A depicts a view illustrating an example of an application management table according to the embodiment.

FIG. 5B depicts a view illustrating the configuration of a dummy application.

FIG. 5C depicts a view schematically illustrating an example of a license management table.

FIG. 8 depicts a view schematically illustrating an example of a license management table for applications held in an application management module of the MFP according to the embodiment.

FIG. 12 depicts a view illustrating an example of a screen displayed in a console unit when a user presses a web application GUI button in the menu screen illustrated in FIG. 10, in the MFP according to the embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that this embodiment describes an example of a web application license management system. Furthermore, the embodiment describes an example in which a multifunction peripheral (MFP) in which is installed a web browser application serves as a client terminal that displays a web application. Moreover, it is assumed that the web application license management is carried out for the individual MFP serving as a client terminal.

Figure 1:
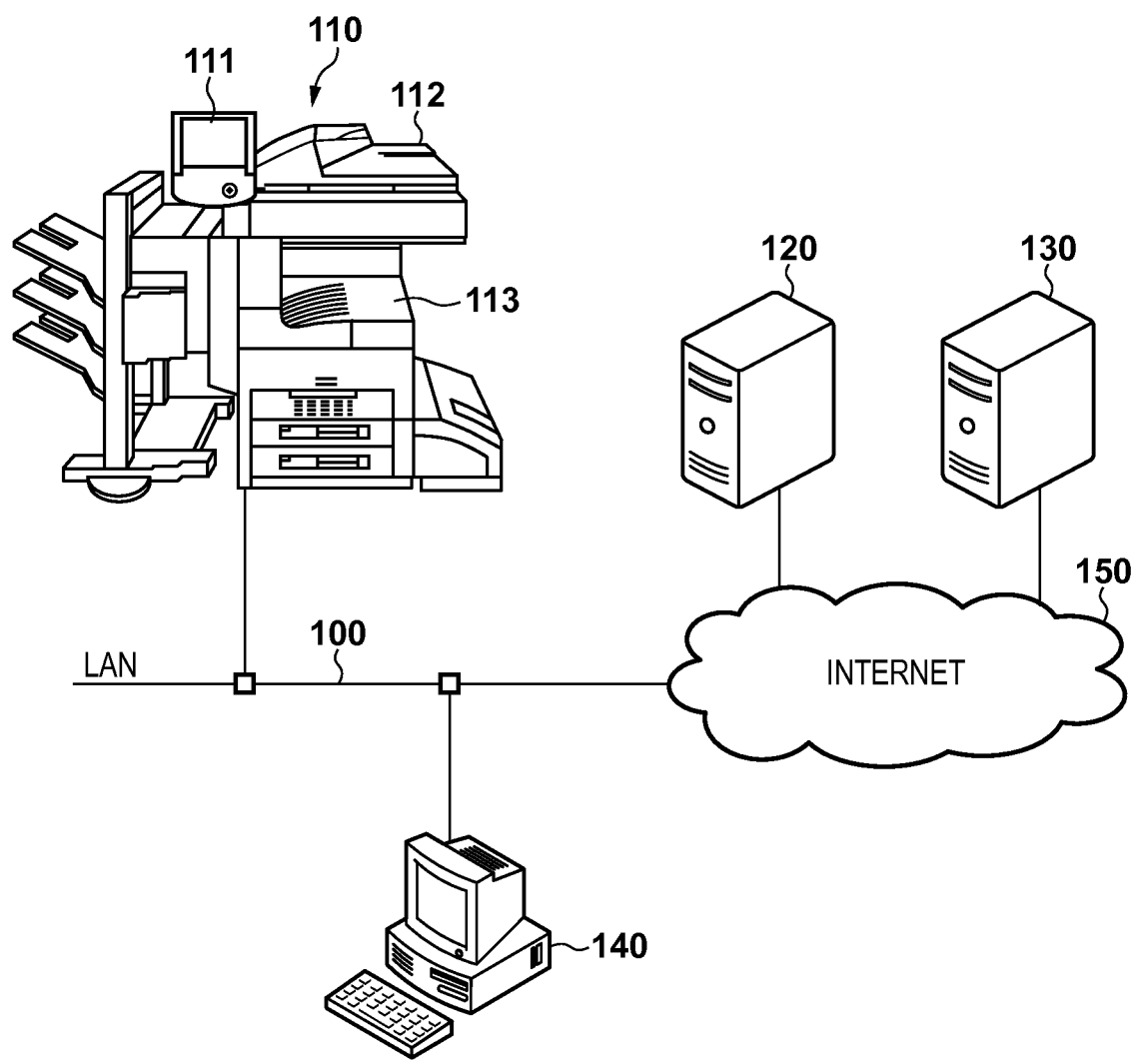
FIG. 1 is a diagram for describing the overall configuration of an information processing system according to an embodiment of the present invention.

FIG. 1 is a diagram for describing the overall configuration of an information processing system according to the embodiment of the present invention.

In this information processing system, an MFP 110 and a PC 140 are connected over a LAN 100, and the LAN 100 is connected to the Internet 150. Furthermore, a license management server 120 and a web application server (web server) 130 are connected to the Internet 150.

The MFP 110 is a multifunction peripheral having a console unit 111, a scanner unit 112, and a printer unit 113. The MFP 110 according to this embodiment functions as a client terminal that displays and runs an operating screen of a web application using an installed web browser. The MFP 110 can print an image obtained from the web application using the printer unit 113 in response to an instruction from the web application, and can read a document using the scanner unit 112 and send image data obtained as a result to the web application. Note that an identifier called a device ID is assigned to the MFP in this embodiment, and the MFP can be specified and recognized uniquely using this identifier.

The license management server 120 is a server that manages licenses of a plurality of different web applications. The web application server 130 is a server that executes web applications. The PC 140 functions as a terminal apparatus for making various types of settings in the MFP 110. Note that the system configuration described thus far is merely one example, and the numbers and so on of these devices are not limited to those described in the present embodiment.

Figure 2:
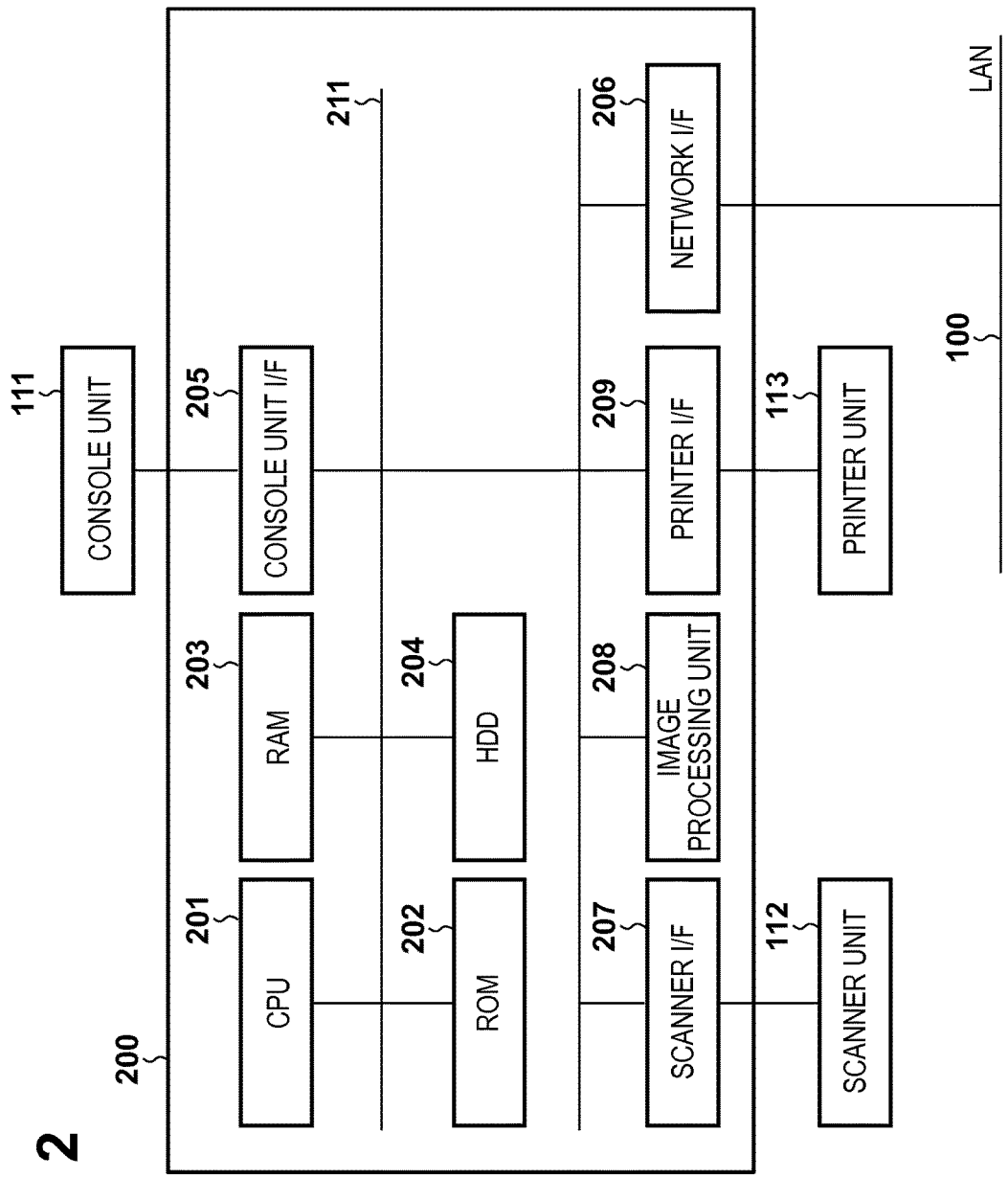
FIG. 2 is a block diagram for describing the hardware configuration of an MFP according to the embodiment.

FIG. 2 is a block diagram for describing the hardware configuration of the MFP 110 according to this embodiment.

The console unit 111 includes a display unit having touch panel functionality, various types of physical keys, and so on, displays information to a user in accordance with data from a control unit 200, and supplies information based on user operations to the control unit 200. The scanner unit 112 reads an image of a document, generates image data of that image, and supplies the image data to the control unit 200. The printer unit 113 prints an image based on the image data received from the control unit 200 onto paper.

The control unit 200 is electrically connected to the console unit 111, the scanner unit 112, and the printer unit 113, and is also connected to the LAN 100 via a network interface (I/F) 206. This enables communication using a communication protocol such as TCP/IP over the LAN 100. In the control unit 200, a CPU 201, a ROM 202, a RAM 203, an HDD 204, a console unit I/F 205, the network I/F 206, a scanner I/F 207, an image processing unit 208, and a printer I/F 209 are connected via a system bus 211. The CPU 201 executes a boot program in the ROM 202, deploys an OS, control programs, and so on stored in the HDD 204 into the RAM 203, and controls the MFP 110 as a whole on the basis of those programs. This control also includes the execution of programs for realizing the flowcharts mentioned later. The boot program of the MFP 110, various types of data, and so on are held in the ROM 202. The RAM 203 provides a work memory used for operations performed by the CPU 201, and also provides an image memory for temporarily storing image data. The HDD 204 is a hard disk drive, and holds the OS, various types of programs, image data, and so on. The console unit I/F 205 is an interface for connecting the system bus 211 and the console unit 111. The network I/F 206 connects the LAN 100 and the system bus 211, and inputs/outputs information via a network. The scanner I/F 207 controls an interface between the scanner unit 112 and the control unit 200. The image processing unit 208 carries out image processing such as rotation, color conversion, image compression/decompression processes, and the like on image data input from the scanner unit 112 and image data to be output to the printer unit 113. The printer I/F 209 accepts image data processed by the image processing unit 208 and controls printing performed by the printer unit 113 in accordance with attribute data that accompanies the image data. Although this embodiment describes an example in which the MFP can display a UI using the console unit 111, an information processing apparatus such as a generic computer or the like may be employed instead of the MFP 110.

Figure 3:
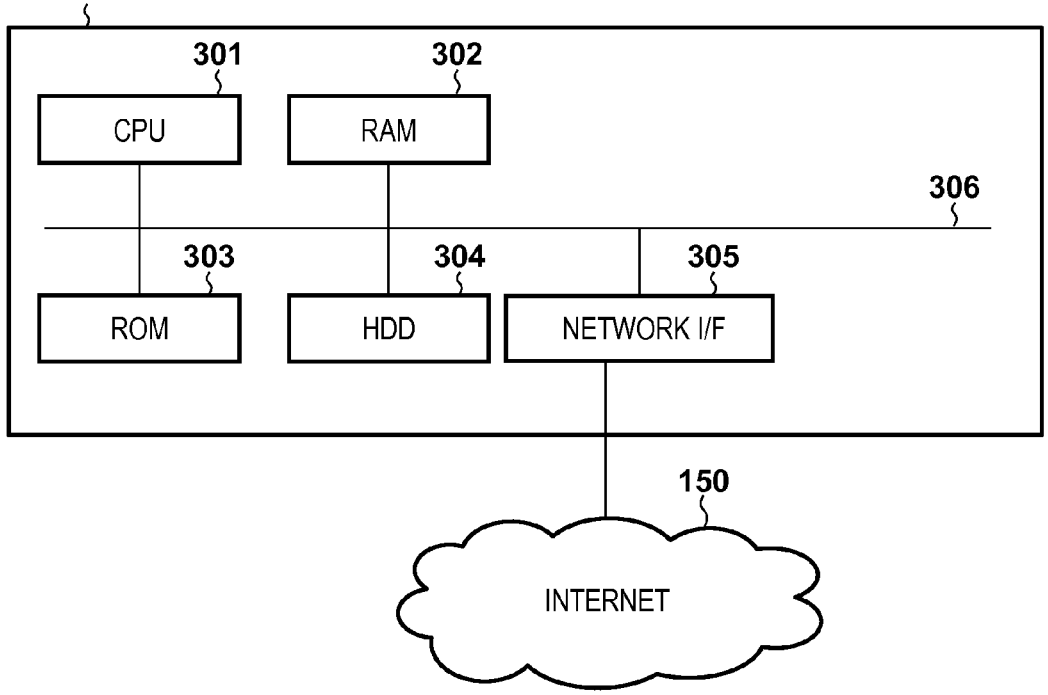
FIG. 3 is a block diagram for describing the hardware configuration of a license management server according to the embodiment.

FIG. 3 is a block diagram for describing the hardware configuration of the license management server 120 according to this embodiment.

The license management server 120 includes a CPU 301, a RAM 302, a ROM 303, a hard disk drive (HDD) 304, and a network I/F 305, and these units are communicably connected to each other via a system bus 306. The ROM 303 holds a boot program, and when the server power is turned on, the CPU 301 reads out the boot program and deploys an OS, control programs, and the like installed in the HDD 304 into the RAM 302. The functions of the license management server 120 are realized by the CPU 301 executing the programs deployed into the RAM 302. The CPU 301 also communicates with other devices on the network to which the server is connected via the network I/F 305. The hardware configurations of the web application server 130 and the PC 140 are the same as the hardware configuration of the license management server 120 illustrated in FIG. 3, and thus descriptions thereof will be omitted.

Figure 4:
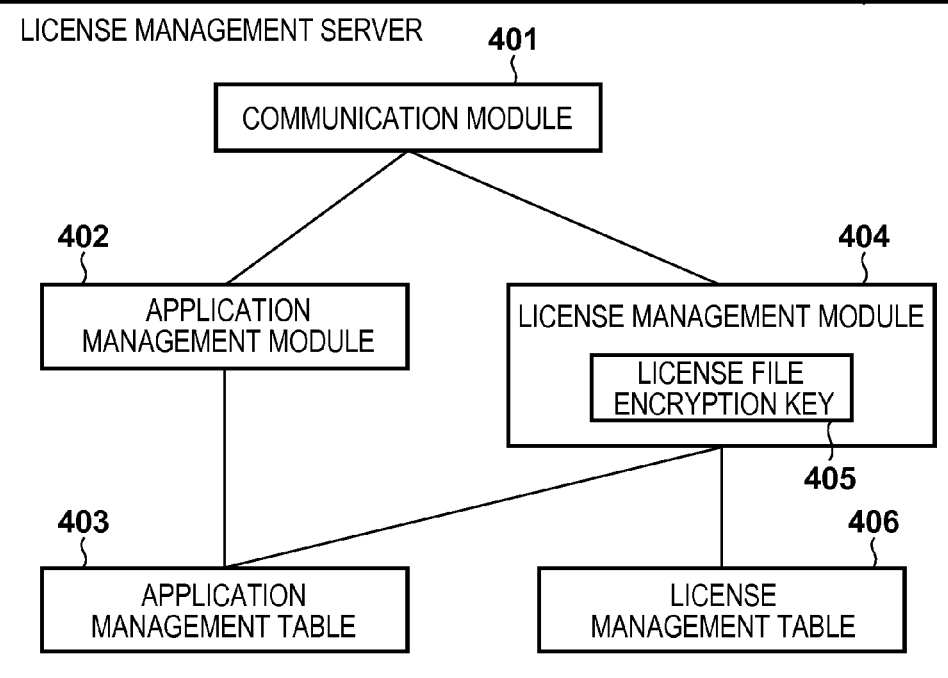
FIG. 4 is a block diagram for describing the software module configuration of the license management server according to the embodiment.

FIG. 4 is a block diagram for describing the software module configuration of the license management server 120 according to this embodiment. Programs for realizing these modules are held in the HDD 304 of the license management server 120, and the functions of the modules are realized by deploying those programs into the RAM 302 and executing the programs using the CPU 301.

The license management server 120 according to this embodiment carries out three processes, namely application encryption, issuing licenses for installing applications in individual MFPs, and issuing license access numbers for managing individual licenses. "Application" referred to here indicates one of the following two types of applications. One is an MFP application that can be installed in the MFP 110 and includes an execution file group for a program that can be run on the MFP 110. The other is a dummy application including a configuration file group for registering a web application, which will be described later.

A communication module 401 accepts processing requests by communicating with an external device over a network, and distributes the requests to an application management module 402 and a license management module 404 in accordance with the processing request. The application management module 402 accepts an unencrypted application and encrypts the application. The application management module 402 accepts the applications from an application development vendor through a terminal (not shown) connected to the Internet 150. The application management module 402 then generates an ID (identification data) for the application and a common encryption key for the application and registers these items in an application management table 403. The application ID is identification information for identifying individual applications. The common encryption key of an application is an encryption key for encrypting the application. The application is encrypted using the common encryption key, and the encrypted application and the ID of the application are sent to the requester. The application management table 403 is a database that stores the application ID and the application common encryption key generated by the application management module 402 in association with each other.

FIG. 5A depicts a view illustrating an example of the application management table 403 according to this embodiment.

Column 501 indicates the application ID and column 502 indicates the application common encryption key.

FIG. 5B depicts a view illustrating the configuration of the dummy application having the configuration file group for registering the web application.

The dummy application has a structure in which hierarchical files and folders are consolidated into a single file. A file 510 is a manifest file for recording a description of the web application. A file 512 is a file in which is recorded a URL for using the web application server 130. Note that unlike this dummy application, the MFP application contains execution files of a program that can be run on the MFP 110.

In the case where the application management module 402 encrypts the application, all files indicated in FIG. 5B aside from the manifest file 510 are encrypted into a single file.

The license management module 404 issues licenses for installing the application in respective MFPs, and manages the license access numbers for issuing the licenses. When a request to issue a license access number corresponding to an application being sold is received from a seller who sells the application, the license management module 404 issues the license access number that corresponds to the application ID. That license access number is then registered in a license management table 406. Here, the license access number is a number for uniquely managing a single license for the application, and the seller of the application sells the aforementioned encrypted application along with this license access number. In addition, upon receiving the license access number and the device ID from a purchaser of the application, the license management module 404 issues a license to the purchaser (user). The issuing of a license is a process that creates a license file corresponding to a license access number by referring to the application management table 403 and the license management table 406.

Here, first, the application ID is obtained from the license access number, and the common encryption key of the application is obtained from the application ID. A license ID is then issued, the device ID and license ID are recorded in the license management table 406, and the license file is generated from these pieces of information as a single file. The license file generated in this manner is then encrypted using an encryption key 405 of the license file held within the license management module 404 and sent to the requester. The encryption key 405 of the license file is the public key of the public key encrypt system. Note that the software of the MFP 110, which will be described later, contains the corresponding secret key. The license management table 406 is a database that stores information related to licenses.

FIG. 5C depicts a view schematically illustrating an example of the license management table 406 according to this embodiment.

Column 521 indicates the application ID, column 522 indicates the license access number, and column 523 indicates an expiration date of the license. Note that this expiration date may instead indicate for how many days the license is valid, from the date when the application is installed in the MFP. Column 524 indicates the device ID (the ID of the MFP in which the application is installed), and column 525 indicates the license ID. Row 526 indicates an example of an application for which the license access number has been issued but the license has not yet been issued, and thus the device ID and the license ID are blank. Row 527 indicates an example of an application for which a license has been issued, where the device ID (DEV001) and the license ID (LIC001) are registered. Row 528 also indicates an example of an application for which a license has been issued, where an expiration date of 20140501, the device ID (DEV002) and the license ID (LIC002) are registered.

In this manner, the ID of the web application and the device ID of the MFP 110 are registered in association with each other in the license management table 406. Accordingly, which application license has been issued to a given MFP can be known by referring to the license management table 406.

Figures 6, 7:
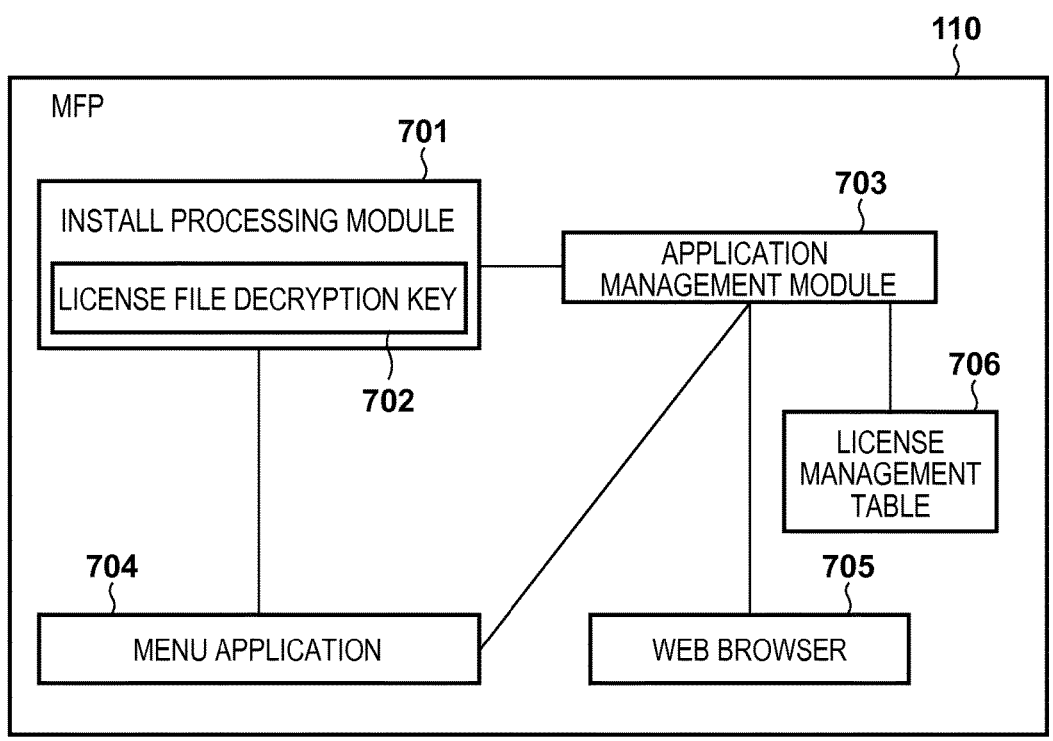
FIG. 6 depicts a view illustrating an example of a license file issued by the license management server according to the embodiment.
FIG. 7 is a diagram for describing an application and the software module configuration of the MFP according to the embodiment.

FIG. 6 depicts a view illustrating an example of the license file issued by the license management server 120 according to this embodiment.

FIG. 6 indicates an example of a license file corresponding to row 528 in the license management table 406 illustrated in FIG. 5C. Here, the license ID (LIC002), the application ID (APP002), the device ID (DEV002), and the expiration date (Jan. 5, 2014) are obtained from the details illustrated in FIG. 5C. Meanwhile, the common encryption key (WasiIDcQR6dYj . . . ) for the application (APP002) is obtained from the application management table 403 illustrated in FIG. 5A. In this manner, the license management module 404 generates the license file on the basis of information obtained from the application management table 403 and the license management table 406.

The purchaser of the application can therefore obtain the encrypted license file on the basis of the license access number of the purchased application.

FIG. 7 is a diagram for describing an application and the software module configuration of the MFP 110 according to this embodiment. The application and software modules are held in the HDD 204 of the MFP 110, and are deployed into the RAM 203 upon execution and executed by the CPU 201.

An install processing module 701 controls the installation of the application. The install processing module 701 is connected to the PC 140 via the network I/F 206, and executes the installation of the application in response to an instruction from the PC 140. The install processing module 701 includes a license file decryption key 702 for decrypting the encrypted license file. The license file decryption key 702 corresponds to the aforementioned license file encryption key 405. An application management module 703 manages the applications installed in the MFP 110, and has a license management table 706 for managing the installed applications and license files.

A menu application 704 displays a GUI for selecting and executing an application installed in the MFP 110. A web browser 705 communicates with the web application server 130. The web browser 705 sends requests to the web application server 130 using the HTTP protocol, renders HTML data returned as responses to the requests and displays the rendered data in the console unit 111, and analyzes and executes JavaScript (registered trademark) returned as a response. Note that the web browser 705 according to the present embodiment cannot accept the input of URLs from users, and thus it is assumed that users cannot directly input URLs and access web sites.

FIG. 8 depicts a view schematically illustrating an example of the license management table 706 for applications held in the application management module 703 of the MFP 110 according to the embodiment.

An application ID 801, an application URL 802, an expiration date 803, and license IDs 804 and 805 are managed by this license management table 706. These license IDs correspond to a plurality of license IDs including license IDs installed in the past, in order to prevent licenses from being reused. The URL 802 indicates a URL of a web application. This URL is registered only in the case where the installed application is a dummy application for a web application.

Row 806 indicates that a license with an unlimited expiration date has been issued with a license ID of "license LIC001" for an application having an application ID of "APP001". Note that the application in row 806 is not a web application and thus no URL is registered.

In row 807, the application whose application ID is "APP002" is a web application, and thus the URL of the web application is indicated in URL 802. The expiration date is indicated as "20140501", and the license is indicated as being issued with license IDs of "LIC001" and "LIC003".

Figure 9:
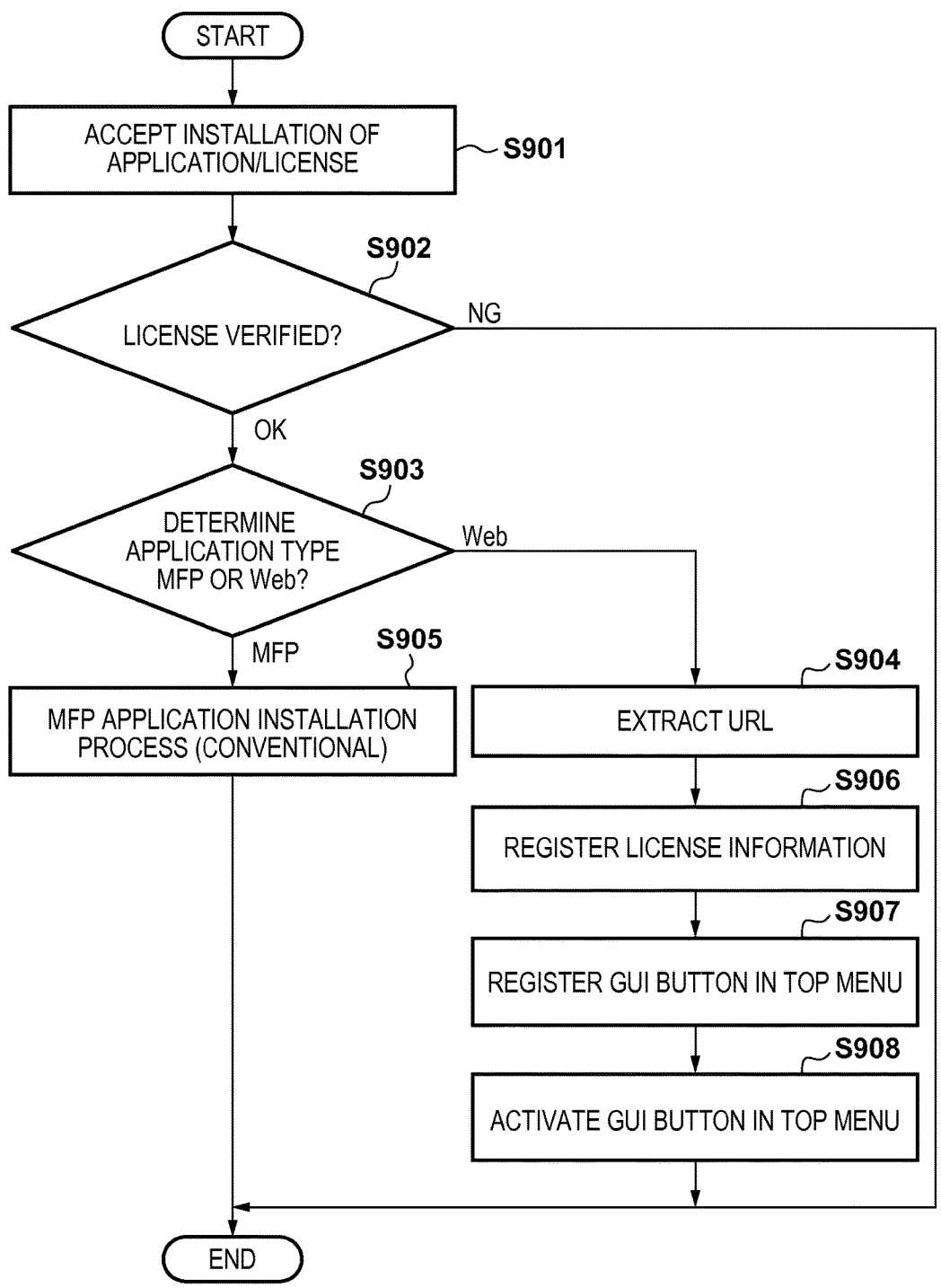
FIG. 9 is a flowchart for describing a process for registering an application carried out by the MFP according to the embodiment.

FIG. 9 is a flowchart for describing a process for registering an application carried out by the MFP 110 according to the embodiment. Note that the programs that execute this processing are installed in the HDD 204, and are deployed into the RAM 203 at the time of execution and executed under the control of the CPU 201. As such, this processing will be described as being carried out by the CPU 201.

As described earlier, the purchaser of the application receives the encrypted application and the license access number from the seller of the application, and receives the license file from the license management server 120.

This process is started when the purchaser of the application uses the PC 140 to start installing the encrypted application and the license file.

First, in step S901, the CPU 201 accepts the installation of the application and the license. Here, when the encrypted application and the encrypted license file are sent by the PC 140, the CPU 201 receives those files. The CPU 201 then decrypts the license file using the license file decryption key 702. Then, the encrypted application is decrypted using the common encryption key of the application included in decrypted license file, and the process advances to step S902. In step S902, the CPU 201 compares the device ID recorded in the decrypted license file with the device ID set in advance for the MFP 110, and determines whether or not the license file correctly matches the MFP 110. In the case where the license file is determined to be correct, the decrypted application is saved in the HDD 204, and the process advances to step S903. This process corresponds to processing carried out by the application management module 703 illustrated in FIG. 7. Note that the process ends in the case where the CPU 201 determines in step S902 that the license file is incorrect.

In step S903, the CPU 201 determines the type of the application. Here, it is determined, based on the decrypted application, whether the application files thereof correspond to an application for the MFP containing execution files or a dummy application for a web application. The process advances to step S904 in the case where the application is determined to be a dummy application, and advances to step S905 in the case where the application is determined to be the application for the MFP 110. In step S905, the CPU 201 installs the application in the MFP 110. This process is the same as conventional application installation processes, and thus detailed descriptions thereof will be omitted.

In step S904, the CPU 201 extracts a URL of the web application. Here, the URL of the web application is extracted from the file 512 in which is recorded the URL held in the dummy application indicated in FIG. 5B, after which the process advances to step S906. In step S906, the CPU 201 registers license information. Here, a date at which the application will expire is obtained from the expiration date recorded in the license file. Furthermore, the URL extracted in step S904, the application ID, the license ID, and the expiry date are registered in the license management table 706 (see FIG. 8).

The process then advances to step S907, where the CPU 201 registers a GUI button in the menu application. Specifically, a GUI button (shortcut button) for accessing the web application corresponding to the URL extracted in step S904 is registered in the menu application. The process then advances to step S908, where the CPU 201 activates the GUI button in the menu application and enables the user to access the web application.

Figure 10:
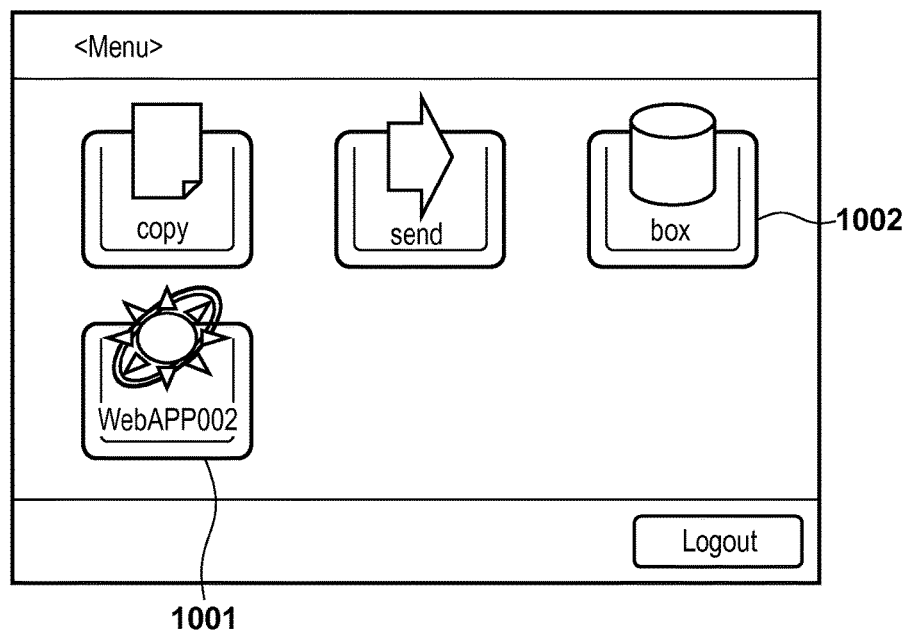
FIG. 10 depicts a view illustrating an example of a GUI displayed in a console unit when a menu application of the MFP is called, in a state where a dummy application is installed in the MFP according to the embodiment.

FIG. 10 depicts a view illustrating an example of a GUI displayed in the console unit 111 when the menu application 704 of the MFP 110 is called, in a state where a dummy application is installed in the MFP 110 according to the embodiment.

A GUI button 1001 is a shortcut button for the web application whose URL has been extracted in step S904 of FIG. 9. A GUI button 1002 is a GUI button for calling an application (a box function) of the MFP 110.

Figure 11:
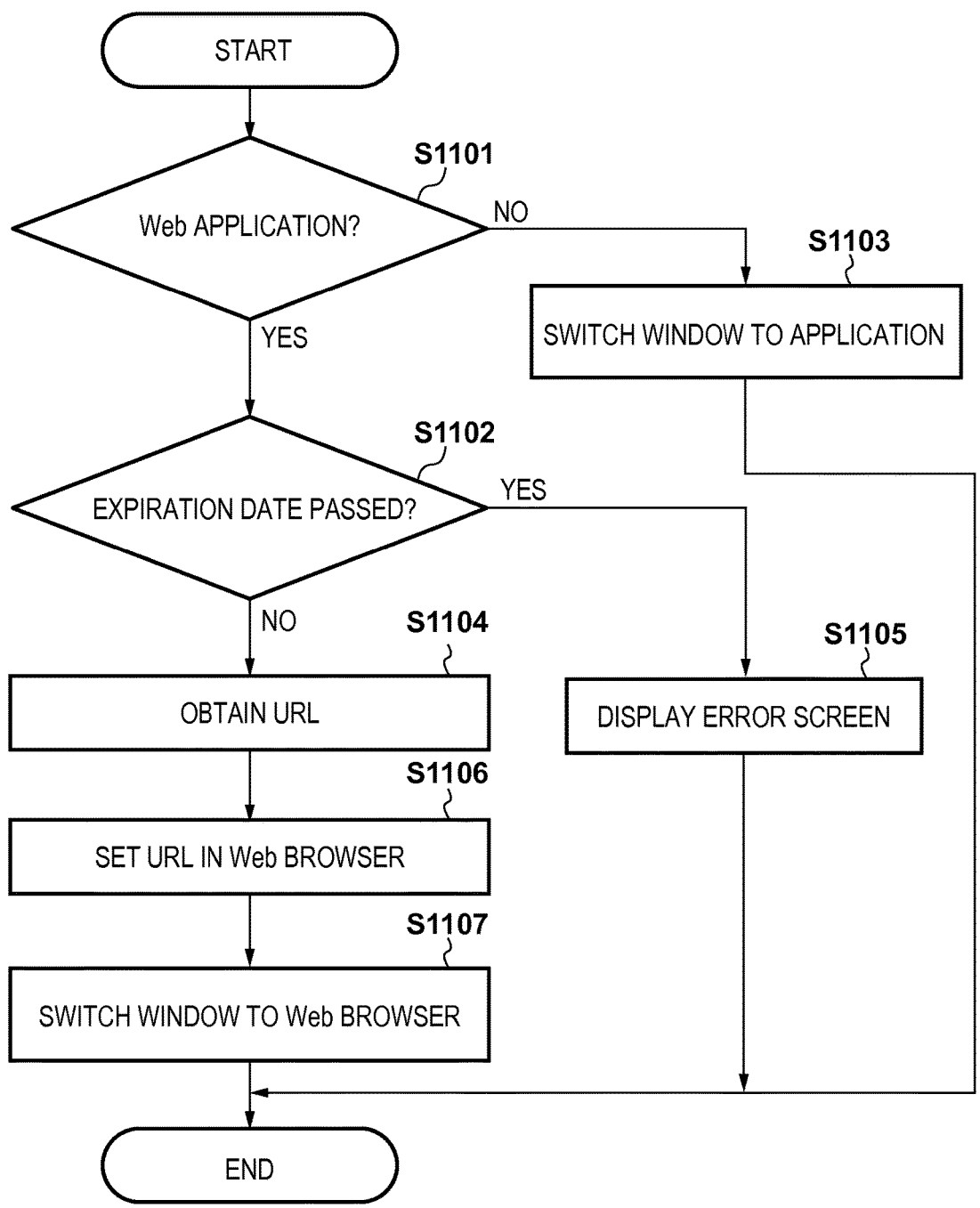
FIG. 11 is a flowchart for describing processing leading up to the display of application content when a user has specified a GUI button in the MFP according to the embodiment.

FIG. 11 is a flowchart for describing processing leading up to the display of application content when a user has specified a GUI button in the MFP 110 according to the embodiment. Note that the programs that execute this processing are installed in the HDD 204, and are deployed into the RAM 203 at the time of execution and executed under the control of the CPU 201. As such, this processing will be described as being carried out by the CPU 201.

This process is started when the user presses the GUI button displayed by the menu application 704. First, in step S1101, the CPU 201 determines whether the GUI button corresponds to the web application or to the application for the MFP 110. In the case where the pressed GUI button corresponds to the web application, the process advances to step S1102, whereas in the case where the pressed GUI button corresponds to the application for the MFP 110, the process advances to step S1103. In step S1103, the CPU 201 switches to a screen of the corresponding application and ends the process. This is the same as processing used conventionally.

However, in the case of the web application, the process advances to step S1102, where the CPU 201 determines the expiration date of the license. Here, for example, the license management table 706 illustrated in FIG. 8 is referred to and the expiration date of the corresponding application ID is confirmed. The current date measured by the MFP 110 is compared with the expiration date 803 of the web application, and the process advances to step S1105 in the case where it is determined that the current date is past the expiration date of the license. In step S1105, the CPU 201 displays an error screen indicating that the expiration date has passed in the console unit 111, and ends this process.

On the other hand, in the case where the CPU 201 determines in step S1102 that the date is within the expiration date, the process advances to step S1104. In step S1104, the CPU 201 obtains the URL of the web application from the license management table 706. The process then advances to step S1106, where the CPU 201 sets the URL obtained in step S1104 in the web browser 705. The process then advances to step S1107, where the CPU 201 switches the display in the console unit 111 from the menu application 704 to a GUI window of the web browser 705, and ends the process.

FIG. 12 depicts a view illustrating an example of a screen displayed in the console unit 111 when a user presses the GUI button 1001 in the menu screen illustrated in FIG. 10, in the MFP 110 according to the embodiment.

FIG. 12 illustrates a case where the web application illustrated in FIG. 10 (whose ID is "App002") has been specified. Here, the web application is a printing application, a screen for selecting a file to be printed is displayed, and a file "sample1.pdf" is selected as the file to be printed.

In this manner, according to this embodiment, it is necessary for the dummy application and the license to be installed in order to activate the GUI button 1001 (shortcut button; display item) required to access the web application. In other words, the web application can be accessed from the console unit 111 of the MFP 110 only in the case where the license file and the software modules are installed.

This makes it possible to consolidate the license management for web applications and the license management for applications installed in the MFP 110, which in turn makes it possible to reduce costs associated with managing the licenses. Furthermore, the licenses of the respective applications can be verified through the same operations regardless of the forms of the respective applications, which lightens the burden of license authentication processing for users.

Meanwhile, the expiration date of a purchased web application is confirmed each time the web application is used. An error screen is displayed when the expiration date has passed, and thus users can be prompted by the screen to carry out processes for purchasing additional licenses or the like.

According to the embodiment described thus far, a web application can be accessed from a console unit only in the case where a license file and a software module of that web application are installed. This makes it possible to consolidate the license management for web applications and the license management for applications installed in the MFP, which in turn makes it possible to reduce costs associated with managing the licenses. Furthermore, licenses can be verified through the same operations regardless of the forms of the respective applications, which lightens the burden of license authentication for users.

Further still, user authentication is unnecessary, which makes it possible to provide license management without affecting a user's workflow.

Finally, whether or not a web application is licensed can be controlled using a GUI button in the same manner as for application installed in the MFP, which makes it possible to provide uniform usability.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-163047, filed Aug. 8, 2014, which is hereby incorporated by reference herein in its entirety.

What is claimed is:

1. An information processing system including an information processing apparatus having a web browser, and a web server,
wherein the information processing apparatus comprises:
a memory device that stores a set of instructions; and
at least one processor that executes the instructions to:
receive an encrypted software module and encrypted license information of the encrypted software module;
decrypt the received encrypted license information and decrypt the encrypted software module using a decryption key contained in the decrypted license information;
in response to a determination that the decrypted software module is a web application, extract a uniform resource locator (URL) of the web application from the decrypted license information and register the URL and the decrypted license information in association with an ID of the web application;
display items each corresponding to an application installed in the information processing apparatus or the web application in a menu screen;
upon an instruction for calling the software module being made by designating an item on the menu screen, determine whether or not the designated item corresponds to the web application;
in response to a determination that the designated item corresponds to the web application, determine whether or not the calling of the web application is enabled based on the registered license information corresponding to the web application; and
in accordance with having determined that the calling of the web application is enabled, set the URL contained in the registered license information corresponding to the web application in the web browser and make a request for the web application to the web server, and
wherein the web server comprises:
a memory device that stores a set of instructions; and
at least one processor that executes the instructions to transmit a screen of a web application corresponding to the URL to the information processing apparatus as a response to the request from the information processing apparatus.

2. An information processing apparatus having a web browser, the apparatus comprising:
a memory device that stores a set of instructions; and
at least one processor that executes the instructions to:
receive an encrypted application and encrypted license information;
decrypt the encrypted license information and decrypt the encrypted application using the decrypted license information;
determine whether or not the decrypted application is a web application;
in accordance with having determined that the decrypted application is the web application, register a uniform resource locator (URL) and information contained in the decrypted license information in association with an ID of the web application;
display an item corresponding to the web application in a menu screen;
upon the item corresponding to the web application being specified in the menu screen, determine whether or not calling of the web application is enabled based on the registered license information corresponding to the web application; and
in accordance with having determined that the calling of the web application is enabled, perform control for obtaining the URL of the web application corresponding to the item, set the URL in the web browser, and display a screen of the web browser.

3. The information processing apparatus according to claim 2, wherein the information contained in the decrypted license information includes an expiration date of the web application, and the at least one processor sets the URL of the web application in the web browser in the case where a date at which the item is specified in the menu screen is before the expiration date.

4. The information processing apparatus according to claim 2, wherein the at least one processor decrypts the encrypted license information using a decryption key held by the information processing apparatus, and decrypts the encrypted application using a common key contained in the decrypted license information.

5. A method of controlling an information processing apparatus having a web browser, the method comprising:
receiving an encrypted application and encrypted license information;
decrypting the received encrypted license information and decrypting the encrypted application using a decryption key contained in the decrypted license information;
determining whether or not an application decrypted in the decrypting is a web application;
registering, upon it being determined in the determining that the application is the web application, a uniform resource locator (URL) contained in the web application and information contained in the decrypted license information;
displaying a display item corresponding to the web application in a menu screen;
upon the item corresponding to the web application being specified in the menu screen, determining whether or not calling of the web application is enabled based on the registered license information corresponding to the web application; and
in accordance with having determined that the calling of the web application is enabled, performing control for obtaining the URL of the web application corresponding to the item, set the URL in the web browser, and display a screen of the web browser.

6. A non-transitory computer-readable storage medium for storing a program for causing a computer to control an information processing apparatus, the program comprising:
- code to receive an encrypted application and encrypted license information;
- code to decrypt the received encrypted license information and decrypt the encrypted application using a decryption key contained in the decrypted license information;
- code to determine whether or not an application decrypted in the decrypting is a web application;
- code to register, upon it being determined that the application is the web application, a uniform resource locator (URL) contained in the web application and information contained in the decrypted license information;
- code to display a display item corresponding to the web application in a menu screen;
- code to, upon the item corresponding to the web application being specified in the menu screen, determine whether or not calling of the web application is enabled based on the registered license information corresponding to the web application; and
- code to, in accordance with having determined that the calling of the web application is enabled, perform control for obtaining the URL of the web application corresponding to the item, set the URL in the web browser, and display a screen of the web browser.

* * * * *